(12) United States Patent
Costin et al.

(10) Patent No.: US 6,210,300 B1
(45) Date of Patent: Apr. 3, 2001

(54) REVERSIBLE ONE-WAY CLUTCH FOR PLANETARY TRANSMISSION

(75) Inventors: Daniel P. Costin, Naperville, IL (US); Thomas Braford, Brighton, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/482,254

(22) Filed: Jan. 13, 2000

Related U.S. Application Data

(60) Provisional application No. 60/143,239, filed on Jul. 9, 1999.

(51) Int. Cl.$^7$ ........................................................ F16H 3/44
(52) U.S. Cl. ........................... 475/294; 475/292; 475/297
(58) Field of Search ................................... 475/294, 292, 475/297; 192/44, 3.56, 3.58

(56) References Cited

U.S. PATENT DOCUMENTS 5,135,444 * 8/1992 Hattori ................................ 475/285

FOREIGN PATENT DOCUMENTS

2096251 * 10/1982 (GB).
61-074940 * 4/1986 (JP).

* cited by examiner

Primary Examiner—Sherry Estremsky
Assistant Examiner—Tisha D. Waddell
(74) Attorney, Agent, or Firm—Artz & Artz P.C.; Greg Dziegielewski

(57) ABSTRACT

A reversible one-way clutch (90) is positioned in parallel with a friction pack (62, 72) to drive a planetary transmission (10) in low gear and reverse. The clutch (90) has a biasing plate (96) secured to its surface to bias the clutch (90) in a direction so that the transmission (10) operates in either low gear or reverse gear. The biasing plate (96) is hydraulically actuated to bias the clutch (90) between low gear, neutral, and reverse gear.

17 Claims, 5 Drawing Sheets

REVERSIBLE ONE-WAY CLUTCH FOR PLANETARY TRANSMISSION

CROSS-REFERENCE TO RELATED APPLICATIONS

This application claims priority from co-pending U.S. Provisional Application Serial No. 60/143,239, which was filed on Jul. 9, 1999.

TECHNICAL FIELD

The present invention relates generally to a one-way clutch for use in parallel with a friction clutch in a planetary transmission. More specifically, the present invention relates to a reversible one-way clutch for use in parallel with a friction clutch to drive the low and reverse gears in a planetary transmission.

BACKGROUND OF THE INVENTION

In current transmission housings, there are a variety of ways to drive the low and reverse gears in a planetary transmission. These current systems utilize conventional designs which yield high cost and high parasitic losses.

Many current systems include a conventional low/reverse multifriction plate clutch pack positioned in parallel with a one-way clutch to ground a carrier of a planetary gear set to a transmission housing. These systems that utilize multi-pack clutches are inefficient and result in high parasitic losses. These prior systems also have high torque requirements, which results in relatively high cost.

Other current systems utilize a double-wrapped band in parallel with a one-way clutch to ground a carrier of a planetary gear set to a transmission housing. These systems that a utilize double-wrapped band require a relatively large amount of space to be implemented and therefore consume a large amount of space in the transmission housing. These systems that utilize double-wrapped bands require a relatively large amount of radial space to be implemented and therefore consume a large amount of space in the transmission housing. Moreover, because these prior systems with double-wrapped bands allow for slippage, which also results in inefficiency and high parasitic losses, they also have a high torque requirement, which makes them relatively expensive to manufacture and use.

SUMMARY OF THE INVENTION

It is an object of the present invention to provide a system for driving a transmission in low and reverse gears that provides lower cost and lower parasitic losses than conventional systems.

It is a further object of the present invention to provide a low/reverse gear system that takes up significantly less space in a transmission housing than current low/reverse gear systems.

It is a still further object of the present invention to provide a low/reverse gear system that can be easily retro-fitted to existing transmissions to improve their efficiency at minimal cost and without taking up additional space.

In accordance with the above objects of the present invention, an improved system for driving a planetary transmission in reverse and low gear is provided. The planetary transmission is in communication with an input shaft to provide rotation thereto. The rotation from the input shaft is transferred to an input planetary assembly, including a sun gear, a pinion gear, a ring gear, and a carrier assembly. A reverse clutch is included which is in rotational communication with the input planetary assembly. To drive the planetary transmission in reverse, the reverse clutch, comprising a friction pack, is caused to spin at engine speed. This reverse clutch is then brought into engagement with the sun gear, which is in communication with an output shaft, to drive the transmission in reverse gear.

A low gear clutch is included which is in rotational communication with the input planetary assembly to drive the transmission in low gear. To drive the planetary transmission in low gear, the input planetary assembly is connected to an output planetary assembly, including a sun gear, an output pinion gear, an output ring gear, and an output carrier assembly. The low gear clutch drives the input ring gear, while the output carrier assembly is fixed. The output ring gear is thus rotating in a direction to drive the transmission in low gear. The output ring gear is in rotational communication with the output shaft. The reverse and low gear clutches are in communication with a reversible one-way clutch which is engaged by the appropriate clutch as required, depending upon in which gear the transmission is to be driven. An actuator is in communication with the reversible one-way clutch to bias the reversible clutch in the appropriate direction to assist in driving the transmission in the appropriate gear.

The reversible one-way clutch includes an outer race and an inner race. A clammed surface is located on either the outer race inner peripheral surface or the inner race outer peripheral surface. A plurality of cam engaging surface members are positioned between the outer race inner peripheral surface and the inner race outer peripheral surface. A biasing plate is in communication with the reversible one-way clutch to bias the reversible one-way clutch based on the actuator to allow either the low or reverse Clutch to drive the planetary transmission.

These and other features and advantages of the present invention will become apparent from the following description of the invention, when viewed in accordance with the accompanying drawings and appended claims.

BEST MODE(S) FOR CARRYING OUT THE INVENTION

Figure 1A:
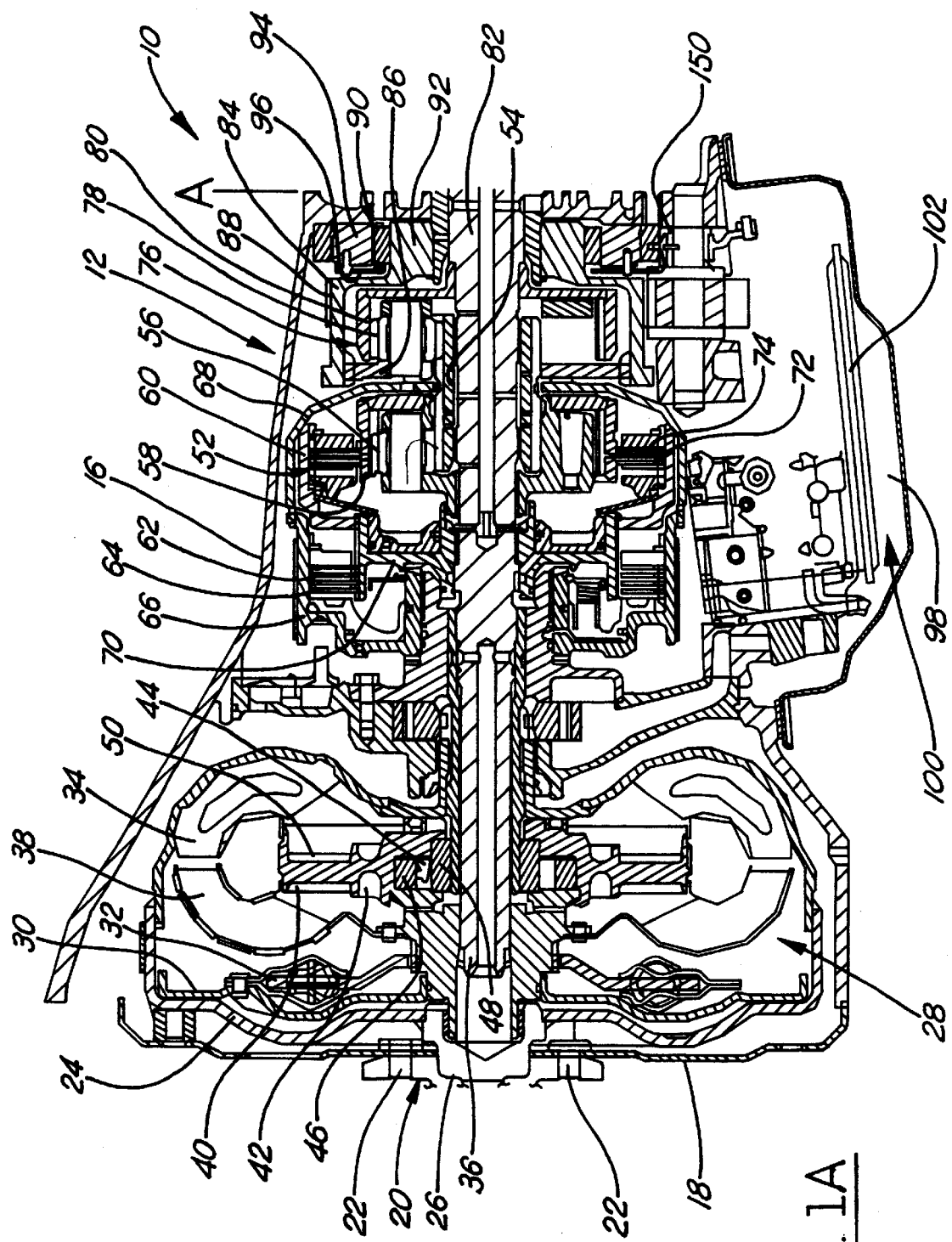
FIG. 1A is a partial cross-sectional view of a first portion of a transmission housing having a reversible one-way clutch for driving a planetary transmission in low and reverse gears in accordance with a preferred embodiment of the present invention.
Figure 1B:
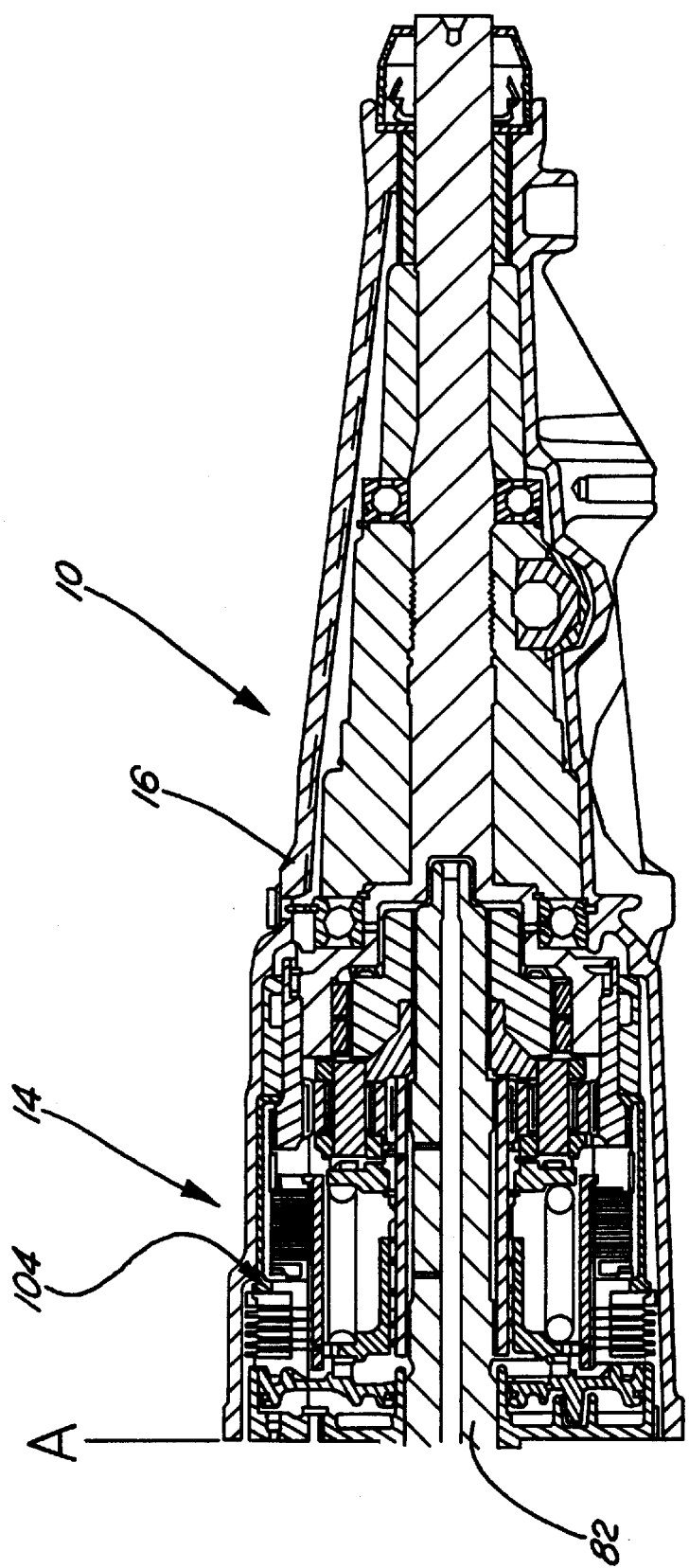
FIG. 1B is a partial cross-sectional view of the corresponding second portion of the transmission housing of FIG. 1A.

FIGS. 1A and 1B are each cross-sectional illustrations of a portion of a planetary transmission 10 in accordance with the present invention. FIG. 1A illustrates a first half 12 of the planetary transmission 10 while FIG. 1B illustrates a second half 14 of the planetary transmission 10. The operation of and the components required to drive the planetary transmission 10 in low gear and reverse gear only are discussed herein. The operation of the disclosed transmission in other gears will be understood by those of ordinary skill in the art and will not be specifically discussed herein. The planetary transmission 10 is preferably for use with a vehicle engine, but may be used to drive any other suitable engine.

With reference to FIG. 1A, the planetary transmission 10 is encased within a transmission housing 16. The transmission housing 16 includes a flex plate 18 that is secured to an engine 20 by a plurality of fasteners 22, such as bolts or the like. However, any conventional fastener may be utilized. To secure the transmission housing 16 to the engine, the fasteners 22 are passed through the flex plate 18 and into the engine block 20. The flex plate 18 is made from a relatively flexible material so as to bend or curve in order to compensate for any misalignment between the engine 20 and the transmission housing 16.

The planetary transmission 10 includes, an impeller housing 24 that is in rotational communication with an engine crankshaft 26. Within the impeller housing 24 is a lockup torque converter 28, including a pressure plate 30 and a lockup clutch 32. The lockup torque converter 28 is in rotational communication with the impeller housing 24 through the pressure plate 30. The pressure plate 30 has a friction material covering its surface so as to minimize slippage when the pressure plate 30 is brought into engagement with the impeller housing 24. When the pressure plate 30 is locked to the impeller housing 24 by a clutch 32, an impeller wheel 34 is caused to rotate at the same speed (engine crank speed) as the impeller housing 24. The impeller wheel 34 is in rotational communication with a shaft 36 through a turbine wheel 38, which is in communication with a turbine blade 40. The turbine blade 40 is in communication with a one-way clutch 44, including an outer race 46 and an inner race 48, through an eye section 42. The clutch 44 in turn is in communication with an impeller blade 50 to drive the impeller wheel 34. Through the operation of the torque converter 28, the rotation of the engine crankshaft 26 causes the shaft 36 to rotate at a known speed. The operation of a torque converter and an impeller to drive a shaft at engine crankshaft speed is well known in the art.

The shaft 36 is in rotational communication with an input planetary assembly 52 to impart rotary motion thereto. The input planetary assembly 52 includes a sun gear 54, an input pinion 56, an input ring gear 58, and an input carrier assembly 60. In reverse gear, the input to the input planetary assembly 52 is controlled by a friction pack 62, comprising a plurality of friction plates 64. The friction pack 62 or reverse input clutch is in communication with a reverse clutch housing 66 which in turn is in communication with a housing 68 whose output rotation is input to the sun gear 54. A T-shaped connector member 70 controls the input from the shaft 36 to the reverse input clutch 62.

In low gear, the input to the input planetary assembly 52 is controlled by a friction pack 72, also referred to as the forward clutch. The forward clutch 72 includes a plurality of friction plates 74 that are in communication with the input carrier assembly 60 which in turn is engageable with the T-shaped connector member 70. In low gear, the forward clutch 72 engages the input ring gear 58 which is in communication with the input pinion gear 56, to cause the sun gear 54 to rotate.

The input planetary assembly 52 is in communication with an output planetary assembly 76 through the sun gear 54. The sun gear 54 is in communication with an output pinion 78 or output carrier that in turn is in communication with an output ring gear 80. The output ring gear 80 is in rotational communication with an output shaft 82 to deliver output speed thereto in either a low or reverse direction depending upon the input to the input planetary assembly 52.

An output drum 84 is in rotational communication with the output ring gear 80 through a connector 86. The output drum 84 has a coast band 88 positioned about its outer periphery. The output drum 84 rotates in response to the rotation of the output ring gear 80. The output drum 84 is in rotational communication with a reversible one-way clutch 90. The reversible one-way clutch 90 has an inner race 92 and an outer race 94. A biasing plate 96, as will be discussed in more detail below, controls the direction of rotation of the reversible one-way clutch 90. Through the use of the biasing plate 96, the planetary transmission 10 can be operated in and switched between low and reverse gears.

FIG. 1A also illustrates a pan 98 attached to the transmission housing 16. The pan 98 preferably includes a valve body 100 and a filter 102 that are designed to remove transmission fluid from the pan 98. Referring to FIG. 1B, the remainder of the planetary transmission 10 is shown in the transmission housing 16, but is not described. The apparatus for operating the transmission in drive gear is referred to generally by reference number 104 and will be readily understood by one of ordinary skill in the art. Additionally, although not shown, an overdrive unit may be incorporated into the planetary transmission 10 in accordance with the present invention.

Figure 2:
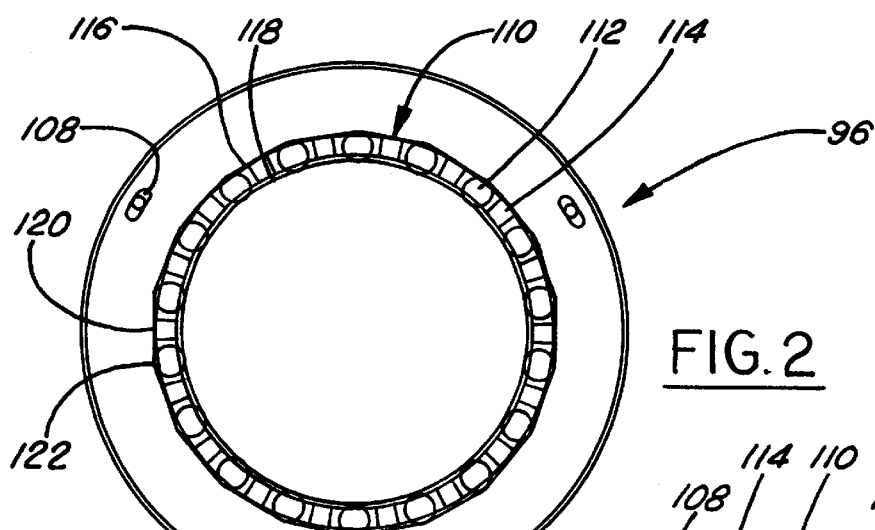
FIG. 2 is a front view of a biasing plate, attached to a face of a reversible one-way clutch, in a neutral position in accordance with a preferred embodiment of the present invention.
Figure 3:
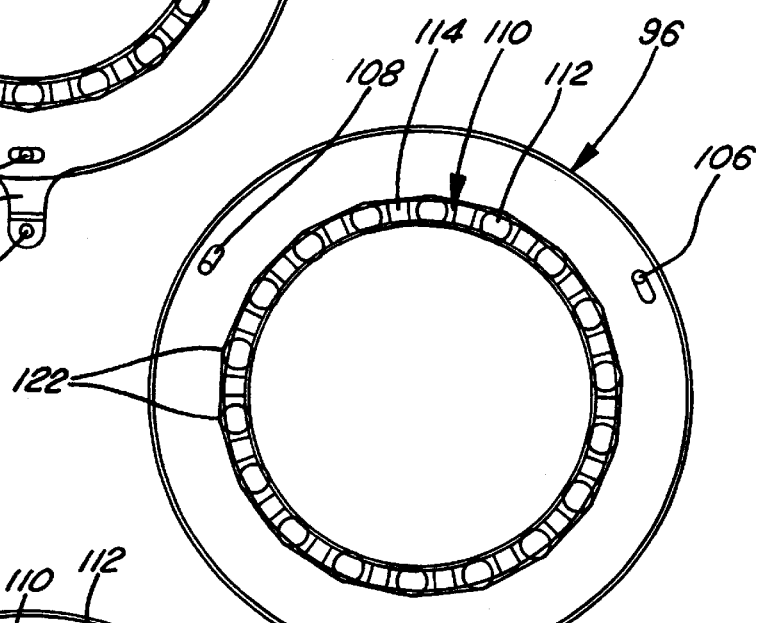
FIG. 3 is a front view of a biasing plate, attached to a face of a reversible one-way clutch, in a position to drive a transmission in low gear in accordance with a preferred embodiment of the present invention.
Figure 4:
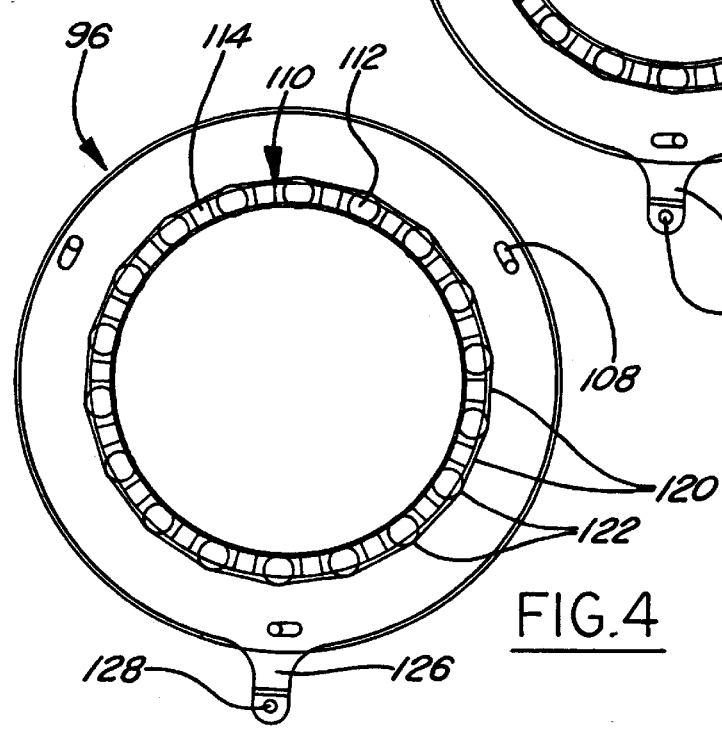
FIG. 4 is a front view of a biasing plate, attached to a face of a reversible one-way clutch, in a position to drive a transmission in reverse in accordance with a preferred embodiment of the present invention.

Referring now to FIGS. 2 through 4, which illustrate a preferred biasing plate 96 in accordance with the present invention. The biasing plate 96 is in communication with the reversible one-way clutch 90 (FIGS. 5 and 6) and is preferably secured to the outer race 94 by tabs 106 extending from the outer race 94. The tabs 106 are configured on the outer race 94 so as to extend through slots 108 formed in the biasing plate 96. The reversible one-way clutch 90 includes a cage portion 110 disposed between the outer race portion 94 and the inner race portion 92. The cage portion 110 includes a plurality of rollers 112 and springs 114. In the preferred embodiment, the reversible one-way clutch 90 is of a roller type, however, other known reversible one-way clutches may be utilized such as a reversible sprag clutch or a reversible ratchet clutch.

Figure 5:
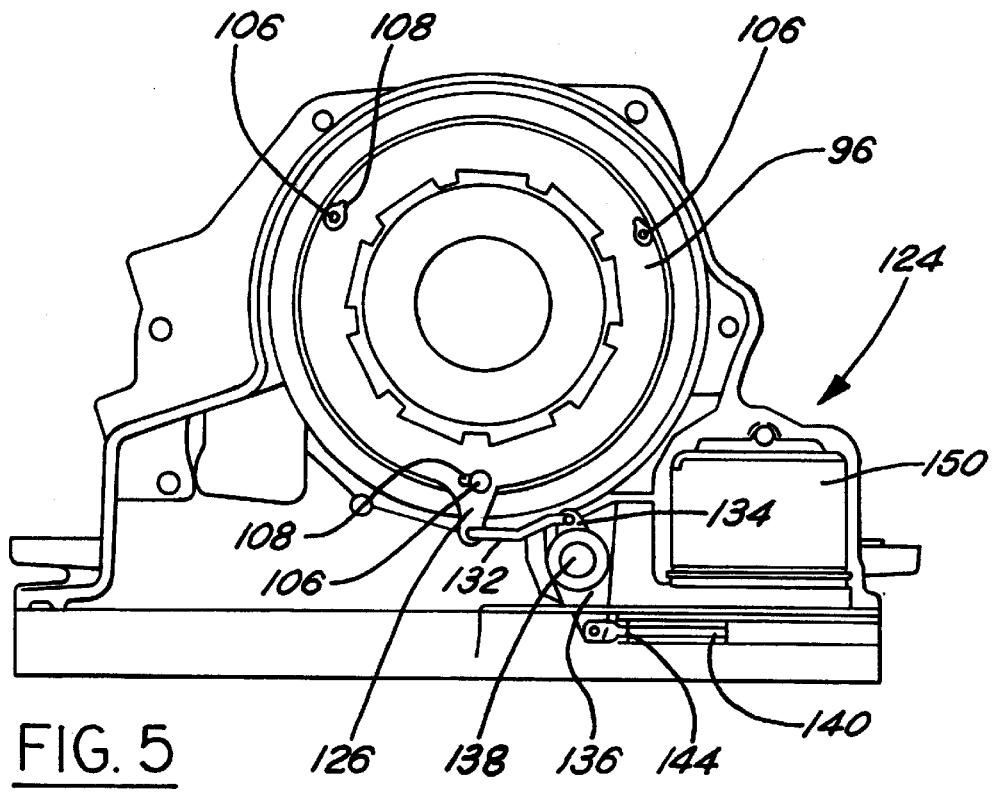
FIG. 5 is a front view of a reversible one-way clutch mechanism with a biasing plate attached thereto in accordance with a preferred embodiment of the present invention.
Figure 6:
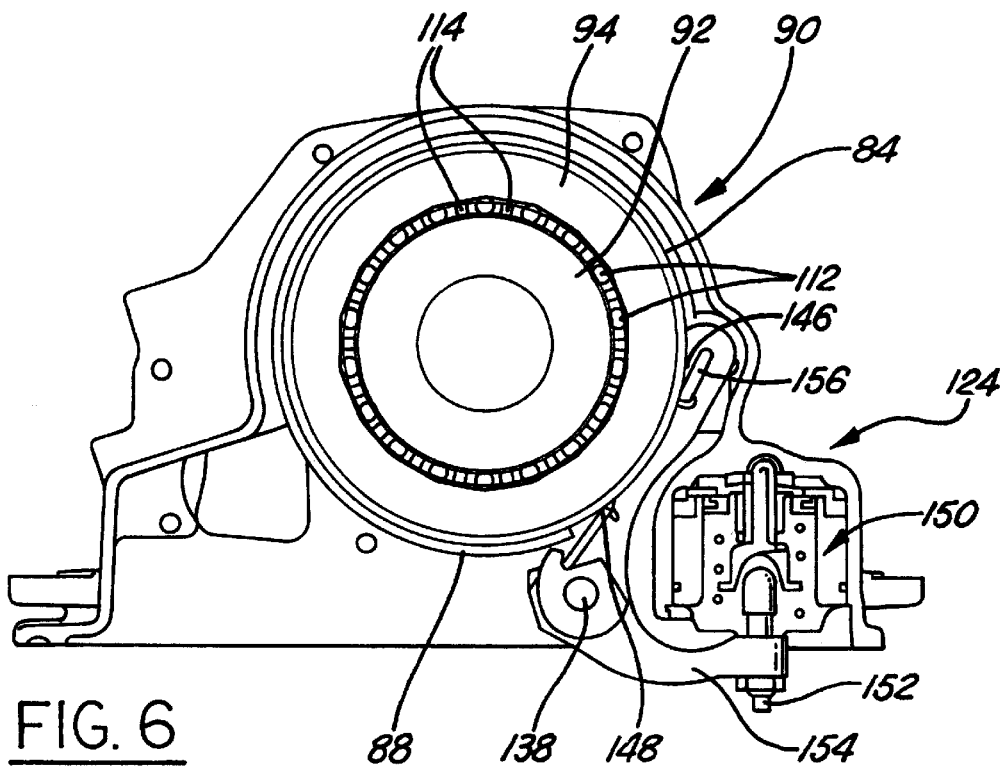
FIG. 6 is a cross-sectional view of a reversible one-way clutch mechanism and actuator mechanism in accordance with a preferred embodiment of the present invention.

In the preferred embodiment as shown in FIGS. 5 and 6, the outer race 94 is fixed while the inner race 92 is rotateable. It should be understood that the transmission 10 could be configured to operate such that the inner race is fixed 92 while the outer race 94 is rotateable. The inner surface 92 has an outer peripheral surface 116 that is generally cylindrical allowing the rollers 112 to freely run thereon. The outer race 94 has an inner surface 118 that is clammed. The clammed surface 118 has a plurality of peaks 120 and valleys 122 that cooperate with the rollers 112.

FIG. 2 illustrates the biasing plate 96 in a neutral position such that the rollers 112 are not biased by the springs 114 to drive the planetary transmission 10 in either low gear or reverse gear. In this position, the rollers 112 are positioned in the valleys 122 of the cammed inner surface 118. In this position, the tabs 106 are positioned generally in the middle of the slots 108.

FIG. 3 illustrates the biasing plate 96 in a position where it has been moved to the left by an actuating means 124, to be discussed in more detail below. The actuating means 124 is attached to an arm portion 126 of the biasing plate 96 (FIG. 5) through an attachment hole 128. When the arm portion 126 of the biasing plate 96 is pushed to the left, as shown in FIG. 3, the tabs 106 are moved within the slots 108 to their right hand surface until movement of the tabs 106 is thereby limited. In this position, the rollers 112 are biased to the left by the springs 114, out of a respective valley 122 and onto the cammed surfaces 130 such that the transmission 10 will operate in low gear. In this position, the rollers 112 are disposed such that the clutch 90 is locked in low gear. In this position, the inner race 92 is unable to travel in a clockwise direction, but instead overruns in the counterclockwise direction.

FIG. 4 illustrates the biasing plate 96 in a position whereby the planetary transmission 10 may be driven in reverse. In this position, the biasing plate 96 is urged to the right by the actuating means 124 and the arm portion 126 is pulled to the right so that the tabs 106 are moved within the slots 108 to their left hand surface until movement of the tabs 106 is thereby limited. In this position, the rollers 112 are biased to the right out of a respective valley 122 and onto the cammed surfaces 130 such that the transmission 10 will operate in reverse gear. In this state, the rollers 112 are disposed such that the clutch 90 is locked in a reverse gear. In this position, the inner race 92 is unable to travel in a counter-clockwise direction, but instead overruns in the clockwise direction.

Figure 7:
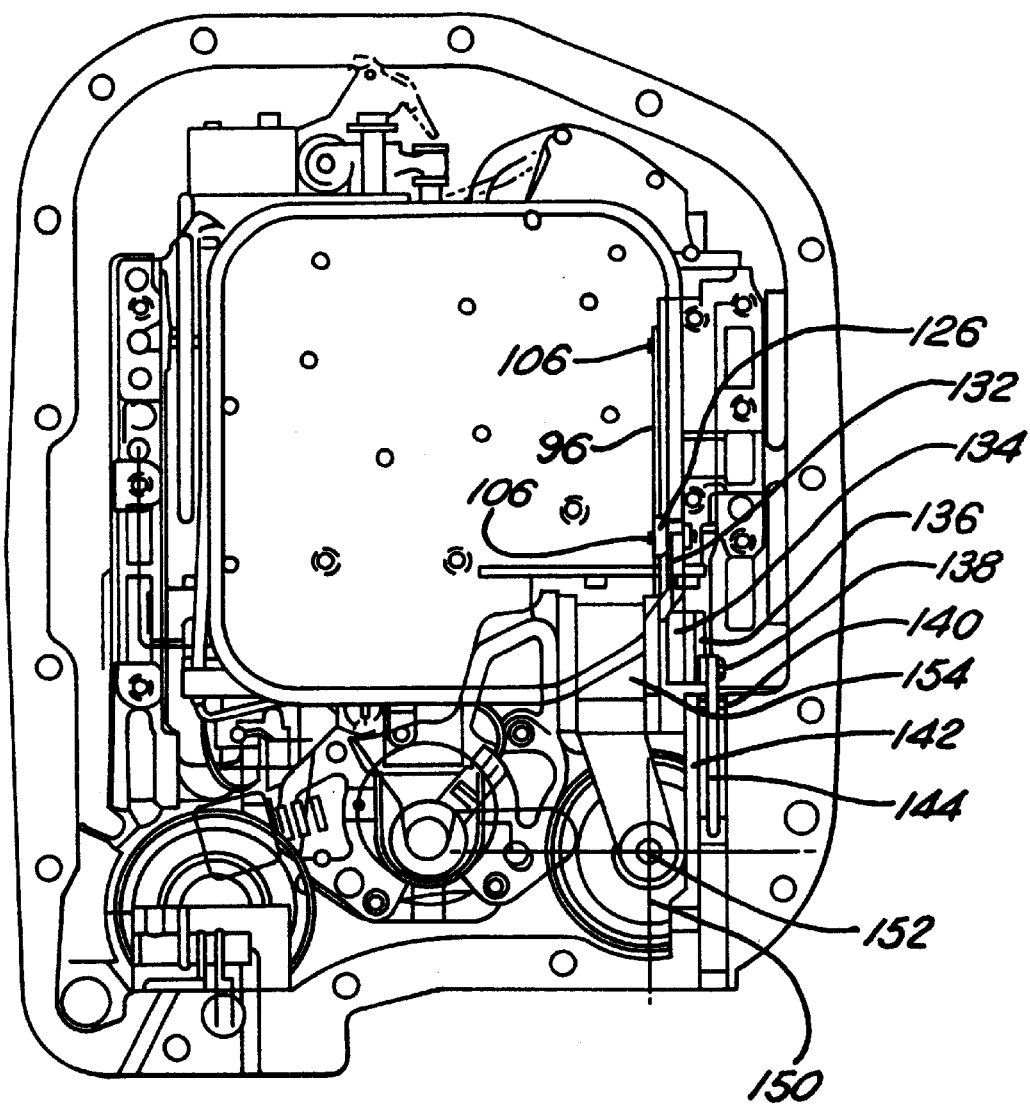
FIG. 7 is a top view broken away of a reversible one-way clutch mechanism and actuator mechanism in accordance with a preferred embodiment of the present invention.

Turing now to FIGS. 5 through 7, which illustrate the operation of the reversible one-way clutch 90 and associated biasing plate 96. As shown in FIG. 5, the biasing plate 96 is secured to the face of the reversible one-way clutch 90 and moves the arm portion 126 by the actuating means 124. The arm portion 126 is attached to a connector bar 132 through an attachment hole 128. The connector bar 132 is attached at its other end to an upper end 134 of a lever 136. The lever 136 rotates about a pivot pin 138 and is attached at its other end to a piston 140. The piston 140 reciprocates within a cylinder 142 that is sealed at its open end by a seal 144. The piston 140 is caused to reciprocate within the cylinder 142 and move the arm portion 126 and thus the biasing plate 96 between a low gear position, a neutral position, and a reverse gear position. The piston 142 is preferably hydraulically actuated. However, the piston 142 may be actuated by other means including electronically.

As shown in FIG. 6, the coast band 88 is disposed around the outer periphery of the output drum 84, which is in communication with the inner race 92. The coast band 88 has a fixed end 146 and a moveable end 148. The actuating means 124 also applies the coast band 88 to the output drum 84 in order to ground the output drum 84 to the carrier housing. The actuating means 124 is preferably a servo motor 150, including a reciprocating piston 152. The piston 152 is attached to a rocker arm 154. The rocker arm 154 is attached at its other end to the pivot pin 138. The pivot pin 138 is also in communication with a connecting rod 156 that is attached to the moveable end 148 of the coast band 88.

When the servo-piston 152 is pushed downward by the servo motor 150, the rocker arm 154 pivots around the pivot pin 138. The drum is positioned rearwardly of the reversible one-way clutch 90, as shown in FIG. 6. As the rocker arm 154 pivots around the pivot pin 138 when the servo-piston 152 is pushed down, the connecting rod 156 is forced upward. This action pulls the moveable end 148 of the coast band 88 toward the fixed end 146 to urge the coast band 88 into contact with the outer drum 86. At the same time the servo piston 152 is pushed downward, the piston 140 urges the biasing plate 96 to a position such that the planetary transmission 10 is operating in low gear. Similarly, when the servo motor 150 causes the servo piston 152 to move upwardly, the connecting rod 156 pulls the moveable end 148 of the coast band 88 away from the fixed end 146 releasing the outer drum 86 and allowing it to rotate with the inner race 92. Concurrently, the piston 140 urges the biasing plate 96 to a position such that the planetary transmission 10 is operating in neutral or reverse.

To operate the transmission 10 in reverse, the reverse friction pack 62 is driven by engaging it to the T-shaped connecting member 70 that spins at engine speed/torque converter speed. This spinning motion is then transferred from the reverse clutch 62 through the reverse clutch housing 66 to the housing 68 and then to the sun gear 54. The sun gear 54 is thus caused to spin at engine speed in the opposite direction as the rotation of the input shaft 26. The rotation of the sun gear 54 is transferred through the output planetary assembly 76 causing the output shaft 82 to rotate in the opposite direction as the crankshaft 26.

To operate the planetary transmission 10 in low gear, the forward clutch 72 causes the sun gear 54 to rotate in the same direction as the engine crank 26. In this position, the output drum 86 is fixed by the coast band 88 causing the rotation of the sun gear 54 to be transferred to the output ring gear 80. The output ring gear 80 drives the output shaft 82 in low gear in this arrangement.

Having now fully described the invention, it will be apparent to one of ordinary skill in the art that many changes and modification can be made thereto without departing from the spirit or scope of the invention as set forth herein.

What is claimed is:

1. Apparatus for driving a planetary transmission (10) in reverse and low gear comprising:

an input shaft (36);

an input planetary assembly (52) in rotational communication with said input shaft (36), said input planetary assembly (52) including a sun gear (54), a pinion gear (56), a ring gear (58), and a carrier assembly (60);

a reverse clutch (62) in rotational communication with said input planetary assembly (52) to drive said transmission (10) in reverse;

a forward clutch (72) in rotational communication with said input planetary assembly (52) to drive said transmission (10) in forward;

a reversible one-way clutch (90) in communication with said reverse clutch (62) and said forward clutch (72); and an actuator (124) to connect said reversible one-way clutch (90) with either said reverse clutch (62) or said forward clutch (72) to drive the planetary transmission (10) in either reverse gear or forward.

2. The apparatus of claim 1, wherein said actuator (124) is hydraulically controlled.

3. The apparatus of claim 1, wherein said actuator (124) is electronically controlled.

4. The apparatus of claim 1, wherein said reversible one-way clutch (90) is a roller-type clutch.

5. The apparatus of claim 1, wherein said reversible one-way clutch (90) is a sprag-type clutch.

6. The apparatus of claim 1, further comprising a biasing plate (96) attached to an outer surface of said clutch, said biasing plate (96) in communication with said actuator (124) to connect said reversible one-way clutch (90) with either said reverse clutch (62) or said forward clutch (72).

7. The apparatus of claim 1, wherein said reversible one-way clutch (90) is in rotational communication with a drum (84) to drive the transmission (10) in reverse gear.

8. The apparatus of claim 7, wherein said drum (84) has a coast band (88) disposed therearound for grounding said drum (84) through said actuator (124) and allowing said reversible one-way clutch (90) to communicate with said forward clutch (72).

9. A method for driving a planetary transmission (10) in reverse and low gear comprising:

driving an input shaft (36) at crankshaft speed;

driving an input planetary assembly (52) through rotation of said input shaft (36);

locating a reverse clutch (62) in rotational communication with said input planetary assembly (52);

locating a forward clutch (72) in rotational communication with said input planetary assembly (52);

providing a reversible one-way clutch (90) in communication with both said reverse clutch (62) and said forward clutch (72); and actuating said reversible one-way clutch (90) into communication with either said reverse clutch (62) or said forward clutch (72) to drive the planetary transmission (10) in either reverse or forward gear.

10. The method of claim 9 further comprising biasing said reversible one-way clutch (90) so as to communicate with said forward (72) or reverse clutch (62) as desired.

11. The method of claim 10, wherein said actuating step is controlled hydraulically.

12. The method of claim 10, wherein said actuating step is controlled electronically.

13. The method of claim 10, wherein said reversible one-way clutch (90) is a roller clutch.

14. The method of claim 10, wherein said reversible one-way clutch (90) is a sprag clutch.

15. The method of claim 10, further comprising locating a drum (84) in rotational communication with said reversible one-way clutch (90).

16. The method of claim 15, further comprising locating a grounding member (88) around said drum (84), said grounding member (88) being moveable between a drum engaging position and an unengaged position.

17. The method of claim 16, further comprising:

grounding said drum (84) through said actuator (124) in order to drive said reversible one-way clutch (90) in forward gear.

* * * * *